US011082311B2

(12) United States Patent
Li et al.

(10) Patent No.: US 11,082,311 B2
(45) Date of Patent: Aug. 3, 2021

(54) SYSTEM AND METHODS FOR SUPPORTING MULTIPLE MANAGEMENT INTERFACES USING A NETWORK ANALYTICS ENGINE OF A NETWORK SWITCH

(71) Applicant: Hewlett Packard Enterprise Development LP, Houston, TX (US)

(72) Inventors: Shen Li, Roseville, CA (US); Kevin M. Worth, Roseville, CA (US); Lisa Pinio, Roseville, CA (US)

(73) Assignee: Hewlett Packard Enterprise Development LP, Houston, TX (US)

( * ) Notice: Subject to any disclaimer, the term of this patent is extended or adjusted under 35 U.S.C. 154(b) by 90 days.

(21) Appl. No.: 16/433,294

(22) Filed: Jun. 6, 2019

(65) Prior Publication Data
US 2020/0389376 A1 Dec. 10, 2020

(51) Int. Cl.
*H04L 12/26* (2006.01)
*H04L 12/24* (2006.01)
*H04L 12/841* (2013.01)
*H04L 12/801* (2013.01)
*H04L 12/721* (2013.01)

(52) U.S. Cl.
CPC .............. *H04L 43/04* (2013.01); *H04L 41/14* (2013.01); *H04L 43/0882* (2013.01); *H04L 47/28* (2013.01); *H04L 47/34* (2013.01)

(58) Field of Classification Search
CPC ..... H04L 43/04; H04L 43/0882; H04L 41/14; H04L 47/28; H04L 47/34; H04L 41/142; H04L 43/0876; H04L 45/70
See application file for complete search history.

(56) References Cited

U.S. PATENT DOCUMENTS

| 10,819,632 | B2* | 10/2020 | Hsu | H04L 47/24 |
| 2018/0351804 | A1* | 12/2018 | Mohanram | H04L 41/0866 |
| 2019/0007333 | A1* | 1/2019 | Monier | H04L 47/6245 |
| 2019/0036795 | A1* | 1/2019 | Ouyang | H04L 43/14 |
| 2019/0132216 | A1* | 5/2019 | Horn | H04L 43/045 |
| 2019/0319855 | A1* | 10/2019 | Barton | G06F 8/60 |

\* cited by examiner

*Primary Examiner* — Harry H Kim
(74) *Attorney, Agent, or Firm* — Sheppard Mullin Richter & Hampton LLP

(57) ABSTRACT

Methods and system for supporting multiple management interfaces using a network analytics engine. The network analytics engine can run on a core switch for performing data collection and monitoring of network traffic through the switch. The switch can receive a first list including a first set of network packet parameters for monitoring network traffic using certain monitoring criteria. Then, the switch can receive a second list including a second set of network packet parameters for monitoring network traffic in accordance using different monitoring criteria. The switch can generate a concatenated list including the first list and the single list to form a single set of packet parameters. Concatenation may be consistent with a determined sequential order and priorities assigned to the lists. The switch can be programmed with the concatenated list such that network monitoring is accomplished using both monitoring criteria, while only implemented a single concatenated list.

16 Claims, 4 Drawing Sheets

SYSTEM AND METHODS FOR SUPPORTING MULTIPLE MANAGEMENT INTERFACES USING A NETWORK ANALYTICS ENGINE OF A NETWORK SWITCH

DESCRIPTION OF RELATED ART

The expansion of Internet usage over the past several years has caused an increased demand for network connectivity. As network connectivity increases, network managers face an even wider range of challenges in maintaining operation of communication networks, such as ensuring that the network is available and delivering new network capabilities. There have been advancements in improving intelligence at the edge of communication networks, allowing network managing tools, such as troubleshooting and diagnostics, to be established via edge devices. Thus, in some existing network monitoring systems, it is edge-based intelligence that drives the networks analytics. For example, devices located at the network edge can be equipped for collecting and/or monitoring network traffic.

BRIEF DESCRIPTION OF THE DRAWINGS

The present disclosure, in accordance with one or more various embodiments, is described in detail with reference to the following figures. The figures are provided for purposes of illustration only and merely depict typical or example embodiments.

Figure 1:
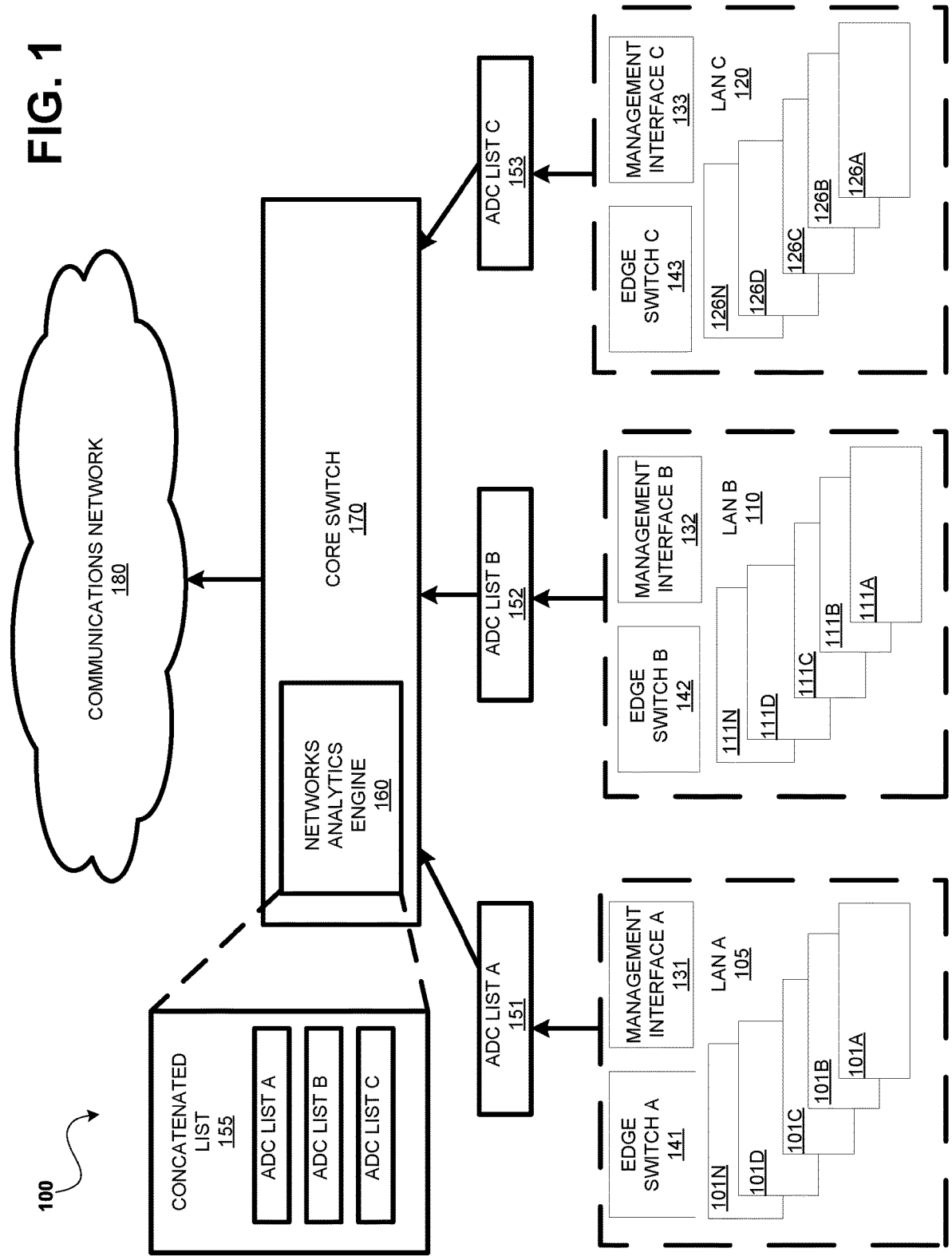
FIG. 1 depicts an example of a system distributed across a communications network that includes a network switch implementing the techniques for supporting multiple management interfaces according to some embodiments.

The figures are not exhaustive and do not limit the present disclosure to the precise form disclosed.

DETAILED DESCRIPTION

Various embodiments described herein are directed to a method and a system for supporting multiple management interfaces on a communications network that employ a networks analytics engine (NAE), for example a NAE running on a network switch that is centralized with respect to the communications network. There may be advantages associated with improving intelligence at a network's core. Centralized network devices, such as a core switch, typically have the benefit of greater visibility of network traffic across the whole topology of the network (or group of networks), as compared to devices at a network edge. Thus, it may be desirable to leverage centralized network devices by integrating network monitoring capabilities needed to support network analytics at the network's core, for example analyzing traffic through a network switch As alluded to above, a NAE can be a tool that is used for management in a computer networking environment. The NAE is a tool that was developed by Aruba™ as a component of a ArubaOS-CX network operating system. As a general description, the NAE is a highly flexible engine that can be used to enable a wide range of solutions to address concerns that may be experienced during operations in a computer networking environment. In particular, the NAE can be used by a network operator, for example, to find root causes to problems using a diagnostics capture with deep analytics (including machine-learning technologies).

A management interface can be a client device, such as a computer with a network analytics related application installed thereon, that is used by a network administrator, for instance, to communicate with the NAE. As an example, a network administrator can use a management interface to access the NAE in manner that allows them to generate particular monitoring rules and conditions that are applied during network monitoring activities performed by the NAE. According to the embodiments, the NAE is capable of supporting multiple management interfaces, where each management interface may be employed by a different network administrator. Due to this capability, each of the network administrators can upload monitoring rules (defined in an ADC list) that may be specific to their respective network monitoring purposes to the NAE, for example rules related to monitoring the quality of Voice Over internet protocol (VoIP) and other rules related to monitoring email-based network traffic. Furthermore, the NAE is capable of simultaneously applying all of the monitoring rules that it receives, via ADC lists uploaded from each of the management interfaces respectively, while analyzing traffic through the switch.

According to the embodiments, the NAE can implement an ADC list concatenation technique to support the multiple management interfaces, as described above. Some conventional network analytic mechanisms that are implemented at the switch-level, are restricted to a single hardware lookup. That is, only a single list that includes one or more monitoring rules and/or conditions which govern how network traffic monitoring is performed (hereinafter referred to as lists) can be applied at a given time, due to the hardware limitations of the switch. However, in many real-world scenarios, different network administrators may have the need to obtain analytics for different types of network traffic (or services). Additionally, network administrators may not be able to coordinate with each other (e.g., face to face, or collaboration software) to allow for a single list, which is inclusive of all of their respective network monitoring needs, to be built in a collaborative manner. In these scenarios, for example, it may be desirable to apply multiple lists at the same switch. As such, each list can respectively include the monitoring rules that are tailored to the specific network analytics desired by an individual network administrator, and each list can be independently generated and uploaded by their respective management interface. Some existing network analysis mechanisms, such as access control lists (ACL) can address conflicts that may arise between different sets of monitoring rules by replacing the previously installed list with the new one. In most cases, only one list can be used per port, or per virtual local area network (VLAN), which still presents challenges in instances where using multiple lists may be preferable (or deemed necessary). Nonetheless, the disclosed ADC list concatenation techniques can mitigate these drawbacks. As described herein, the ADC list concatenation techniques can effectively merge monitoring rules from multiple individual lists by concatenating each list received to form a single concatenated list which is then implemented by the NAE at the switch. Consequently, the NAE can apply the concatenated list to network monitoring in a manner that emulates the multiple lists running on the same switch simultaneously. Even further, the embodiments are implemented at the logic-level (e.g., using the switch's existing hardware), thereby eliminating the associated expense and complexity associated with hardware modifications at the switch.

FIG. 1 depicts an example of a system 100 distributed across a communications network 180. In the illustrated example, the system 100 includes multiple local area networks (LANs), shown as LAN A 105, LAN B 110, and LAN C 120. Each of the LANs 105, 110, and 120 may be installed at a customer premises, such as in retail a store, a business (e.g., restaurants, shopping malls, and the like), a factory, an office building, and the like. Furthermore, each of the LANs 105, 110, and 120 may include multiple client devices that are communicatively connected to their respective local network.

FIG. 1 also shows that system 100 can include a core switch 170, and multiple edge switches 141-143. As a general description, a core switch, such as core switch 170, is a backbone device that is central to the network's operation. Often times, a core switch is used to connect to servers, wide area networks (WANs), such as the Internet, and to aggregate other switches that may be deployed throughout the network architecture. Edge switches, on the other hand, illustrated as edge switches 141-143 in FIG. 1, can correspond to segments of the network architecture (as opposed to being centralized). For example, edge switch 141 A can be used to support connectivity and communication for client devices 101A-101N, that may be laptops, desktops, wireless access points, and the like with their local network 105 A. For this reason (in reference to FIG. 1) core switch 170 is considered to be centralized with respect to the overall system 100 at the backbone, and by and large can have a greater visibility of communication across the whole topology of the network architecture of system 100 (or group of networks) as compared to edge switches 141-143. As alluded to above, some conventional network monitoring mechanisms utilize edge-based techniques. In some cases, existing network security mechanisms use edge devices to collect and analyze traffic associated with the network in which the edge devices reside. In contrast, the disclosed embodiments leverage characteristics of core switches to implement a network-central technique, where network traffic through a core switch is monitored in a manner that does not affect the traffic flow, and further supports being controlled (or managed) by multiple management interfaces (e.g., each interface being associated with a different network, administrator, or organization). Thus, in accordance with the embodiments, core switch 170 is shown to include a network analytics engine 160 in FIG. 1. The network analytics engine 160 provides network traffic monitoring functionality at the switch as described in greater detail below. In some embodiments, core switch 170 is further equipped with fast and powerful processing resources, and can include a robust set of features that enhance the network analytics features described herein. It should be appreciated that the disclosed network analytics and multiple management capabilities are not limited to being implemented at a core switch, and can include implementations at other network devices, such as edge switches, routers, and the like.

FIG. 1 particularly illustrates that LAN A 105 can include edge switch A 141, LAN B 110 can include edge switch 142, and LAN C 120 can include edge switch 143. As a general description, edge switches 141-143 can connect their associated end-user LAN to other networks at ingress/egress points, also referred to as a logical "edge" of the network, for routing communication to and/or from the LAN. For instance, edge switch A 141 can be placed relatively close to client devices 101A-101N in order to forward communication from these devices to the backbone of the network, or core switch 170. In some instances, communication to one of the edge switches 141-143 can be further communicated to destinations outside of their respective LAN, such as to other LANs or the Internet.

As seen in the example of FIG. 1, LAN A 110 includes client devices 101A-101N, LAN B 110 includes the client devices 111A-111N, and LAN C 120 includes the client devices 120A-120N. The client devices, for example client devices 101A-101N may include a desktop, a laptop, or a mobile device such as a smart phone, a tablet, or any other portable computing device that is capable of communicating through LAN A 105. The plurality of client devices, such as client devices 101A-101N, can communicate locally within their respective LAN, for example LAN 105. Also, the client devices can communicate externally. As an example, client device 101A can access information and/or services that are made available through a wide area network (WAN), like the Internet, shown as communication network 180.

In both instances, communicating with the client devices in system 100 involves the transfer of data, in most cases encapsulated in packets, between the communicating device via the networks. Collectively, the data communicated to and/or from the devices and networks comprising system 100 can be referred to as network traffic. Network traffic monitoring, as referred to herein, can involve the process of collecting and analyzing network traffic for any abnormality or process that can affect network performance, availability, and security. A key objective behind network traffic monitoring, in many applications, can be to ensure availability and efficiency of the network. As previously described, some conventional network monitoring mechanisms observe traffic at the network's edge. Due to the ingress/egress function of many edge devices, edge-based monitoring often includes manipulating the monitored network traffic before it is allowed cross an edge to enter (or exit) a network. Referring to FIG. 1, in a scenario where edge switch A 141 implements a conventional network traffic monitoring approach, the edge switch A 141 may use packet sniffing to review each incoming and outgoing packet of LAN A 105, and drop or permit packets as deemed appropriate, for example based on a access control list (ACL). Current network traffic monitoring mechanisms also employ other features that can impact traffic flows in the network, such as: controlling traffic inbound/outbound of the switch; separate network traffic into individual flows and queue; traffic shaping, and the like. According to the embodiments, core switch 170 can implement network traffic monitoring involving a count action, which counts a number of packets that satisfy a monitoring condition. Thus, as an alternative to mechanisms that monitor traffic at the edge in way that ultimately impacts the network traffic, the NAE 160 implements centralized collection of analytics data relating to the network traffic, rather than collecting and manipulating the network traffic itself.

As described above, the embodiments implement network monitoring capabilities from the network's core. This centralized network monitoring architecture lends itself to an added ability of collectively monitoring multiple smaller networks that may be aggregated at the network's core. Again referring to FIG. 1, the core switch 170 including NAE 160 is configured to perform intelligent and centralized network monitoring of LANs 105, 110, and 120 substantially simultaneously.

As a general description, the NAE 160 is a solution that automates network monitoring and troubleshooting. The NAE 160 can run within a OS, such as an ArubaOS-CX, on supported computer platforms. Engineers can access the NAE through a web interface, and APIs can allow access to individual agents (which run in Linux containers) and to NAE databases. When a problem arises the agents of the NAE 160 can provide notifications to pertinent users, for example IT staff, and provide results of analysis. Some of the capabilities of the NAE 160 are supported through its database access. For instance, the NAE can access a database relating to configuration and states, which provides NAE agents with full access to configuration, protocol state, and network statistics (all fully exposed through REST API). In another example, the NAE can access a database relating to time series data, which can contain relevant historical data correlated with configuration changes. In this case, the NAE 160 can access the database to provide operators with the ability to capture and archive the network context surrounding a network event.

The NAE 160 can provide faster time to root cause with its monitoring, data collection, and analytics capabilities. In an example of using the NAE 160 for root cause analysis, user problems can be mapped to root causes by automating common diagnostic routines that often lead directly to the exact problem. Using built-in monitors and data collection agents, the NAE 160 can predetermine many first and second order diagnostics, allowing network operators to focus on a smaller and more targeted set of root causes.

Additionally, agents of the NAE 160 can test for conditions and take actions based on the results the condition. An example of a condition might be a high hit count on an ACL, which would trigger an action to generate an alert and create a Syslog message or a custom report. A network operator can also use the NAE 160 to combine multiple actions into workflows to perform more selective diagnostics or recommendations. Besides providing the ability to monitor the status of a switch 170, the NAE 160 allows the agents, scripts, and alerts to be configured and viewed. The NAE 160 also has the capability to automatically generate graphs that enable additional context for troubleshooting networks.

The NAE 160 may be implemented in hardware and/or software which further configures hardware of the core switch 170 to execute the network analytics aspects and techniques for supporting multiple management interfaces, as disclosed. For example, the NAE 160 can program the core switch 170 to execute various actions that allow automated collection of data relating to network traffic from LANs 105, 110, 120 through the switch 170 for providing network analytics. Further, the NAE 160 can be remotely managed, so as to allow a user, such as a network administrator, to adaptively configure the various network analytics related functions that are executed by the core switch 170. The core switch 170 can receive instructions, for example software scripts, which define one or more criteria used to govern network traffic monitoring at the core switch 170. As shown in FIG. 1, management interfaces 131-133 can be included in the system 100 for controlling the remote management capabilities previously described.

The management interfaces 131-133 can include software and/or hardware intended to collaborative function with the NAE 160 in manner that enables a user that is interacting with the interface to manage, or otherwise control, some functions of the NAE 160. In the illustrated example, each of the management interfaces 131-133 are communicatively connected to a respective one of the LANs 105, 110, and 120. As seen, management interface A 131 is connected to LAN A 105, management interface B 132 is connected to LAN B 110, and management interface C 133 is connected to LAN C 120. The management interfaces 131-133 can be configured for allowing a respective user to program aspects of the NAE 160. The management interfaces 131-133 can include software and/or hardware intended to collaborative function with the NAE 160 in manner that enables a user of the management interface to manage, or otherwise control, some functions of the NAE 160. For instance, a graphical user interface that enables a user, such as a network administrator, to author a NAE script that includes monitoring criteria specifically pertaining to monitoring network traffic on LAN 105. After the instructions are generated, the management interface 131 can communicate these instructions to the NAE 160. As a result, the core switch 170 executes monitoring in accordance with the received instructions. As previously described, in many real-world scenarios, different network administrators may have the need to obtain analytics for different types of network traffic (or services). Consequently, each set of instructions that are generated by the respective management interfaces 131-133 may be directed to different monitoring criteria. In the illustrated example, management interface A 131 may generate an ADC list A 151 including criteria that is specific to monitoring LAN A 105, management interface B 132 may generate an ADC list B 152 including criteria that is specific to monitoring LAN B 110, and management interface C 133 may generate ADC list C 153 including criteria that is specific to monitoring LAN C 120.

Furthermore, FIG. 1 serves to illustrate that the NAE 160 has the ability to generate a single concatenated list 155, in accordance with the list concatenation techniques disclosed herein. According to the embodiments, the concatenated list 155 allows multiple individual lists, shown as ADC list A 151, ADC list B 152, and ADC list C 153, to be combined in a manner that enables the core switch 170 to execute them collectively as a single list. Thus, in the case where each of the ADC lists 151-153 may be generated to ascertain different analytics for the different networks, for example each list having different network monitoring criteria, the core switch 170 can use the concatenated list 155 to execute network monitoring corresponding to each list simultaneously. For example, the core switch 170 may monitor LAN A 105 based on the monitoring criteria conveyed in ADC list A 151, while separately monitoring LAN B 110 based on the monitoring criteria conveyed in ADC list B 152, and so on. Consequently, the core switch 170 is effectively programmed to monitor network traffic flows in accordance with rules/criteria included in each of the multiple lists, namely ADC list A 151, ADC list B 152, and ADC list C 153, that are merged into the single concatenation list 155. In some cases, the network analytics that are derived by core switch 170 from monitoring in accordance with the concatenated list 155 can be mapped back to the corresponding individual ADC list. As an example, ADC list A 151 can include a list of packet header attributes (e.g., source and destination identifiers) related to rules for monitoring VoIP traffic. Accordingly, any traffic identified by the core switch 170 as matching the VoIP monitoring criteria of ADC list A 151, will be associated with that particular list and analytics provided to the corresponding management interface, which is management interface A 131. Similarly, in the example of FIG. 1, analytics corresponding to the monitoring criteria of ADC list B 152 can be mapped back to management interface B 132, and analytics for ADC list C 153 can be mapped back to management interface C 153. Thus, the concatenation techniques satisfy the single list hardware restrictions, while allowing multiple users to employ their respective network monitoring rules (e.g., monitoring various types of network traffic, monitoring network traffic for multiple networks) through the shared core switch 170.

Figure 2:
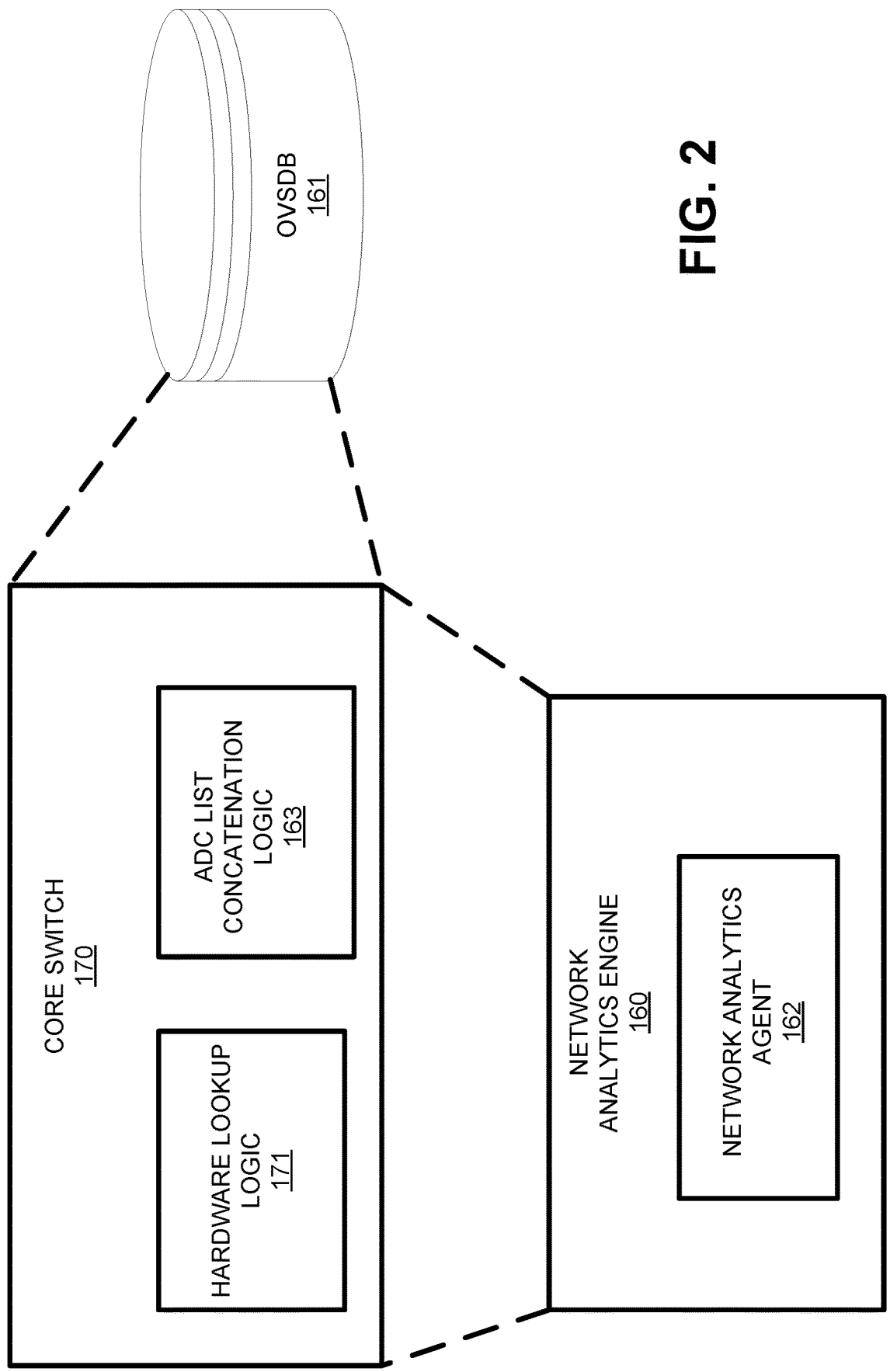
FIG. 2 illustrates an example of the network switch shown in FIG. 1 including analytics data collection (ADC) list concatenation logic for supporting multiple management interfaces, according to some embodiments.

FIG. 2 particularly illustrates an example of a core switch 170, including the NAE 160 which implements the centralized network monitoring, as described above. In detail, the NAE 160 is shown in the include a network analytics agent 162. The core switch 170 is shown to include hardware lookup logic 164, and ADC list concatenation logic 163. In some cases, the hardware lookup logic 163 can be implemented by hardware circuitry, such as an Application Specific Integrated Circuit (ASIC) of the core switch 170. The core switch 170 can also include an Open vSwitch Database (OVSDB) 161 which is used as storage by the core switch 170. For example, the ADC lists received by the core switch 170 can be stored, or otherwise maintained by the OVSDB 161. According to the embodiments, the ADC list concatenation logic 163 can be hardware and/or software of core switch 170 which executes the list concatenation aspects described herein. It should be appreciated than in some implementations, aspects of the ADC list concatenation logic 163 can be implemented by the NAE 160.

Figure 3:
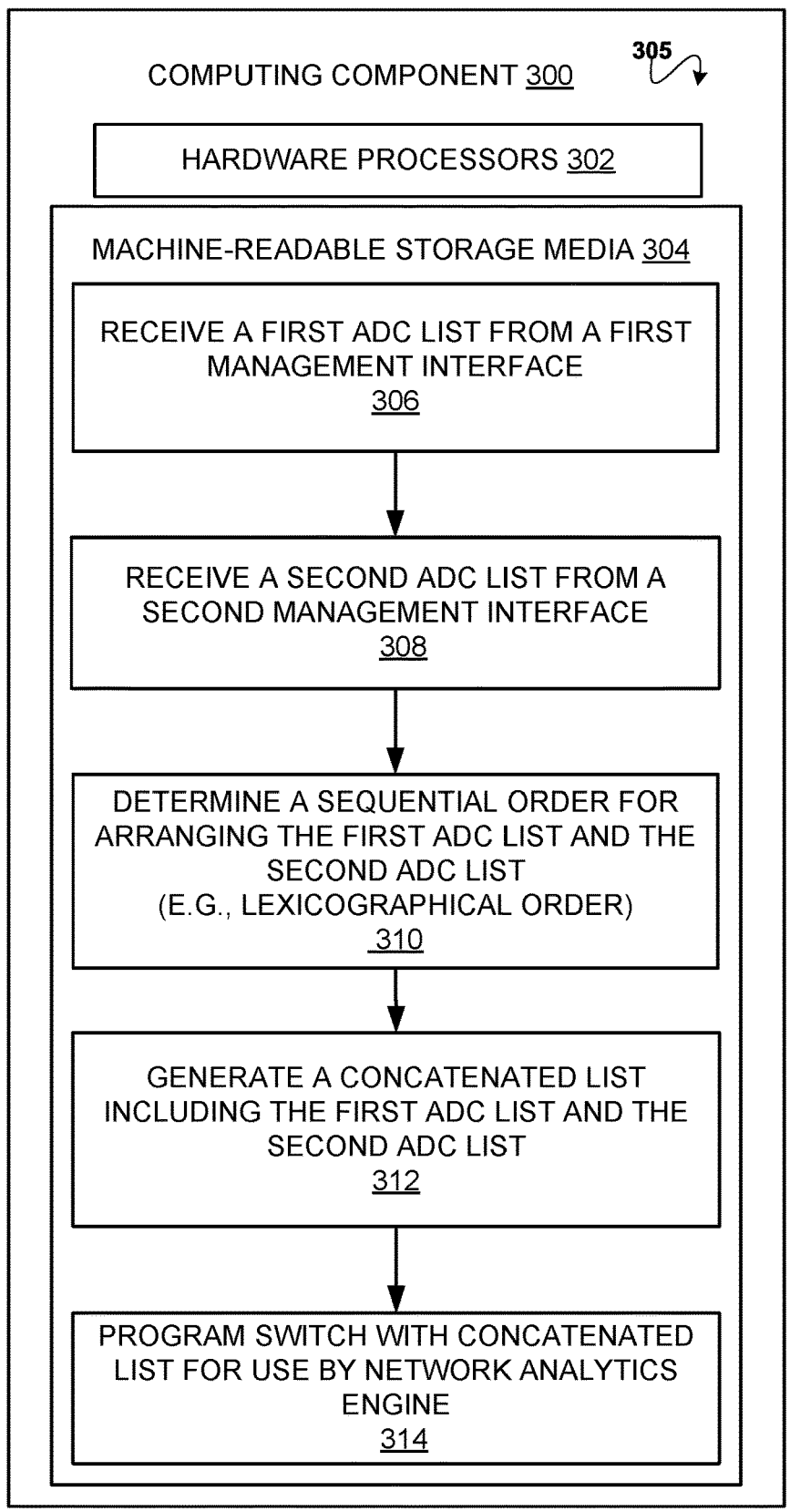
FIG. 3 is an operational flow diagram illustrating an example of a process for supporting multiple management interfaces using ADC list concatenation, according to some embodiments.

Further details of the ADC list concatenation features are now described with reference to FIG. 3, which illustrates an example of a process 305 according to one embodiment of the systems and methods described herein. As seen in FIG. 3, process 305 is illustrated as a series of executable operations in a machine-readable storage media 304 performed by a hardware processor 302. The computing component 300 can be a core switch (shown in FIG. 1) implementing network analytics capabilities, as previously described.

In an operation 306, a first ADC list from a first management interface may be received at the core switch, for example. As described above in reference to FIG. 1, the first management interface may be a computer device connected to a first network, such as a LAN, in which a network administrator, or similar type of user that may be have a need for retrieving network analytics, can control aspects of the NAE at the core switch. Particularly, the user can generate the first ADC list using the first management interface. In some embodiments, the first ADC list can include a set of network packet parameters, such as parameters that may be included in an Internet Protocol (IP) packet header. The network packet parameters in the first ADC list can be used to identify packets within the network traffic that have certain characteristics for purposes of network monitoring. For example, the first management interface can create a first ADC list including criteria for monitoring VoIP traffic, identified as traffic marked with a specific Differentiated Services Code Point (DSCP) value. Traffic monitoring based on the first ADC list can involve identifying packets in the network traffic that have one or more packet parameters that match the VoIP and DSCP criteria entered in the first ADC list, and ultimately deriving associated analytics. In some embodiments, operation 306 involves storing the first ADC list in a database, such as the OVDSB, or other storage mechanism at the core switch. Furthermore, a time-based identifier, such as a time stamp, may be associated with the database entry for the ADC list. The time-base identifier can be used to indicates a time the first list was stored, for example to derive a chronological ordering for multiple ADC lists that may be received, and subsequently stored, by the core switch. Additionally, in some cases, an identifier corresponding the first ADC list, such as a name, can be received. As an example, a network administrator may assign a name "VOIP" to the first ADC list. A name, or any other identifier deemed suitable for identifying an ADC list for purposes of deriving an ordering scheme can be associated with the database entry for the first ADC list.

Next, at an operation 308, a second ADC list from a second management interface may be received at the core switch. The second ADC list may be similar in structure to the first ADC list, for example including a list of packet parameters that are used for monitoring network traffic in accordance with the defined set of monitoring criteria. However, the second management interface may be associated with a different user, a different network, or different organization than the first management interface. For example, the second management interface may be a computer device connected to a second network related to the core switch. Thus, the second management interface may be used by another network administrator. Accordingly, the first ADC list and the second ADC list can be generated independently from each other, for instance without requiring direct collaboration between the first network administrator (generating the first ADC list) and the second network administrator (generating the second ADC list). Even further, the second ADC list can have a second set of network packet parameters that correspond to a second monitoring criteria. In some scenarios, the first monitoring criteria and the second monitoring criteria are different from each other, such that a network administrator can obtain network analytics that are customized for their respective network monitoring purposes. In continuing with the previous example, the second network may not support much VoIP traffic in comparison to the first network. Thus, analytics related to VoIP may not be deemed appropriate for criteria for monitoring the second network. In contrast, the second network administrator can generate the second ADC list for quality of Service (QoS) monitoring, for example. In an example scenario, the second ADC list, is generated by the second management interface and received at the core switch. In some embodiments, as described above in reference to the first ADC list, identifiers can also be associated with the second ADC list. The core switch can store a list name and/or time-based identifier that corresponds to the second ADC list. These identifiers can be particularly employed for determining a sequential order for arranging the received ADC list with respect to each other, while generating the concatenated list, which is discussed in greater detail below.

After the multiple ADC lists have been received, the process may proceed to operation 310. At operation 310, a sequential order for arranging the first ADC list and the second ADC list may be determined. The sequential order can pertain to arranging the first ADC list, and its contents, with respect to the second ADC list, and its respective contents during concatenation. In some embodiments, determining the sequential order involves one or more sorting rules that effectively assign a particular priority to each of the lists. The sorting rules can be based on various factors that are deemed suitable for assigning priorities. Priorities may be associated with characteristics, values, or parameters that are capable of being logically sorted into an order, which can be further be translated into an ordering scheme for arranging the ADC lists when combined into the concatenated list. As a general description, sorting rules may be applied which causes an ADC list that is assigned a highest priority to be placed above all other ADC lists to be concatenated, while an ADC list having the next highest priority can be placed immediately following. An ADC list having a lower priority can being arranged below the previous two lists within the order, and so on until the list assigned to the lowest priority is at the bottom, or is placed lowest in the sequential order.

By hinging a sequential order to priorities, as described above, the scheme for ADC list concatenation has an underlying significance that is placed on prioritization of the lists. In some embodiments, the hardware lookup logic may be configured to sequentially step through each packet parameter within the concatenated list (e.g., top to bottom) in the order in which the lists are arranged during concatenation. That is, the core switch may monitor network traffic using the concatenated list, and a packet matching the first packet parameter listed in the concatenated list (e.g., associated with an ADC list having the highest priority, therefor being arranged at the top of the concatenated list) may be counted towards that corresponding criteria. In some instances, the hardware lookup may be configured to perform comparisons with other remaining packet parameters in the list. A scenario may arise where a packet observed by the core switch may correspond to a monitoring criteria in more than one ADC list. Nonetheless, in accordance with the embodiments, the packet may only be counted towards the ADC list having the highest priority within the concatenated list (based on the sorting rules) for purposes of analytics. Restated, ADC lists having a higher priority may be encountered sooner by the logic than ADC lists having lower priorities, as the core switch executes the concatenation list. As such, operation 310 can involve one or more users setting the sorting rule, which thereby governs assigning priority. For instance, the core switch may receive input from a user that selects a particular sorting rule. The user-selected sorting rule can then be subsequently applied by the logic to assign priorities for the ADC lists, and then determine the sequential order for arranging the multiple lists during concatenation. Alternatively, the core switch can be configured to automatically select sorting rule(s) and/or assign priorities as a capability of the NAE (e.g., ADC list concatenation logic) being set without the input of a user. In yet another alternative, a user can directly assign priorities to each of the ADC lists, where the logic is only required to sort the ADC lists based on the user-assigned priorities.

In an embodiment, operation 310 may involve the logic applying a chronologically based sorting rule in order to ultimately arrange the first ADC list and the second ADC list in a sequential order. For example, a chronologically based sorting rule can assign priorities by starting with a highest priority being given to a first ADC list that is received at the earliest time by the core switch (or stored first in the OVSDB), and then assigning priorities to each ADC list subsequently received by the core switch at later times, in a descending order for instance. The priorities can correspond to the chronological order of times at which each ADC list was received by the core switch. The lowest priority in the chronological sorting rule may be given to the list received as the latest time by the core switch (or stored last in the OVDSB). Examining the time-based identifiers, such as time stamps, which are associated with each of the ADC lists in some embodiments, may be used to govern sorting and/or assigning priorities in a chronological order.

In another embodiment, the operation 310 may involve the logic applying a lexicographically based sorting rule to ultimately arrange the first ADC list and the second ADC list in a sequential order. In this case, text-based identifiers can be associated with the received ADC lists and further may be used as the basis for sorting and assigning priorities to the ADC lists. Each ADC list can be given a name, for example a file name, that can be analyzed by the logic as a text string of characters. Accordingly, the ADC lists can be sorted alphabetically by their corresponding names (e.g., lexicographical order), and then assigned a priority that is consisted with the sorted order. Referring back to the example of the first ADC list having the name "VOIP," the second list may be associated with another name, for instance "QOS." In accordance with the lexicographically based sorting rule, a text analysis of the abovementioned names can cause the first ADC list and the second ADC list to be sorted alphabetically by their respective names. In this example, sorting at operation 310 may result in the second ADC list being alphabetically sorted above the first ADC list (e.g., 'Q' before 'V'). Subsequently, the second ADC list can be assigned a higher priority than the first ADC list. These priorities can be used to determine the sequential order in operation 310, where the ADC list having the higher priority is arranged before the ADC list with the lower priority during concatenation. After the sequential order for the ADC lists has been determined, the process 305 may proceed. It should be appreciated that determining the sequential order for ADC lists can be based on various factors as deemed suitable, and thus operation 310 is not limited to performing chronological and lexicographical based sorting described above.

Next, in operation 312, the concatenated list may be generated, including the first ADC list and the second ADC list. In some instances, concatenating in operation 312 may involve combining a number of files associated with each ADC list, for instance a script defining the monitoring rules, into a single file. Referring to the example of FIG. 1, concatenating can include merging the contents of a file of ADC list A, a file of ADC list B, and a file of ADC list C together into a single file. The type of concatenation performed at operation 312 can involve various forms of concatenation techniques that are applied to data types used in the context of programming, such as string concatenation (e.g., joining strings together), object concatenation, and the like. The process 305 is directed to an example of concatenating two ADC lists are for purposes of discussion, it should be appreciated that the embodiments are not limited to this example, and that the concatenation techniques disclosed can be applied to any number of lists as deemed suitable and/or appropriate. For instance, referring back to FIG. 1, the concatenated list is illustrated as including three combined lists, namely ADC list A, ADC list B, and ADC list C. According to the embodiments, operation 312 is performed by an ADC list concatenation logic (shown in FIG. 2) that can be implemented at the core switch. Moreover, in some embodiments, concatenation in operation 312 can be performed in multiple stages. As an example, a concatenated list may already include the first ADC list and the second ADC list in their current state. At some time thereafter, a third ADC list may be added to the concatenation, for instance being concatenated to the end of the concatenated list.

In some embodiments, process 500 can involve the concatenated list being adjusted, or otherwise manipulated, in other ways. The core switch may be configured to implement removal of an ADC list from the concatenated list. In reference to FIG. 1, ADC list B can be removed from the concatenated list. In this case, the packet parameters associated with ADC list B may be deleted from the middle of the concatenated list (e.g., between ADC list A and ADC list C), while maintaining the sequential arrangement of the remaining ADC lists. As a result of the remove operation, in this example, concatenated list would include ADC list A, which is arranged directly above ADC list C. Further continuing with the example, it may be possible to add ADC list B back to the concatenated list after its removal. For example, adding ADC list B again can cause the logic to concatenate ADC list B to the bottom of the existing concatenated list, thus forming a new list order. The resulting concatenated list can include an order of ADC list A, ADC list C, followed by ADC list B. This example serves to illustrate that the disclosed concatenation techniques have a level of adaptability, allowing users to customize the concatenated lists in a manner that achieves a desired function of the core switch for the purposes of network monitoring.

Thereafter, at operation 314, the core switch can be programmed with the concatenated list. By downloading the concatenated list to the core switch, process 300 continues to operate within the limitation of programming the hardware logic of the switch with a single ADC list. According to the embodiments, the concatenated list can be programmed as a portion of the logic implemented by the switch ASIC. As such, the concatenated list can be utilized by the NAE, as described in detail with reference to FIG. 1, to perform network monitoring in accordance with the criteria within the concatenated list. As such, the core switch can implement network analytics for multiple networks, or for multiple network management interfaces, concurrently. For example, after operation 314, the core switch is programmed with the concatenated list, which includes the merged first ADC list and the second ADC list. Accordingly, as the hardware lookup logic (shown in FIG. 2) executes the concatenated switch, the core switch can monitor network traffic in accordance with the first monitoring criteria associated with the first ADC list and the second monitoring criteria associated with the second ADC list simultaneously. In contrast, as previously alluded to, some existing switch implementations are limited by its hardware lookup logic, which allows only a single ADC list to be programmed thereon, and executed. Thus, the list concatenation aspects of process 300 provide a solution that allows multiple ADC lists to be downloaded to (and executed by) the core switch without necessitating a brute-force modification at the hardware-level.

Figure 4:
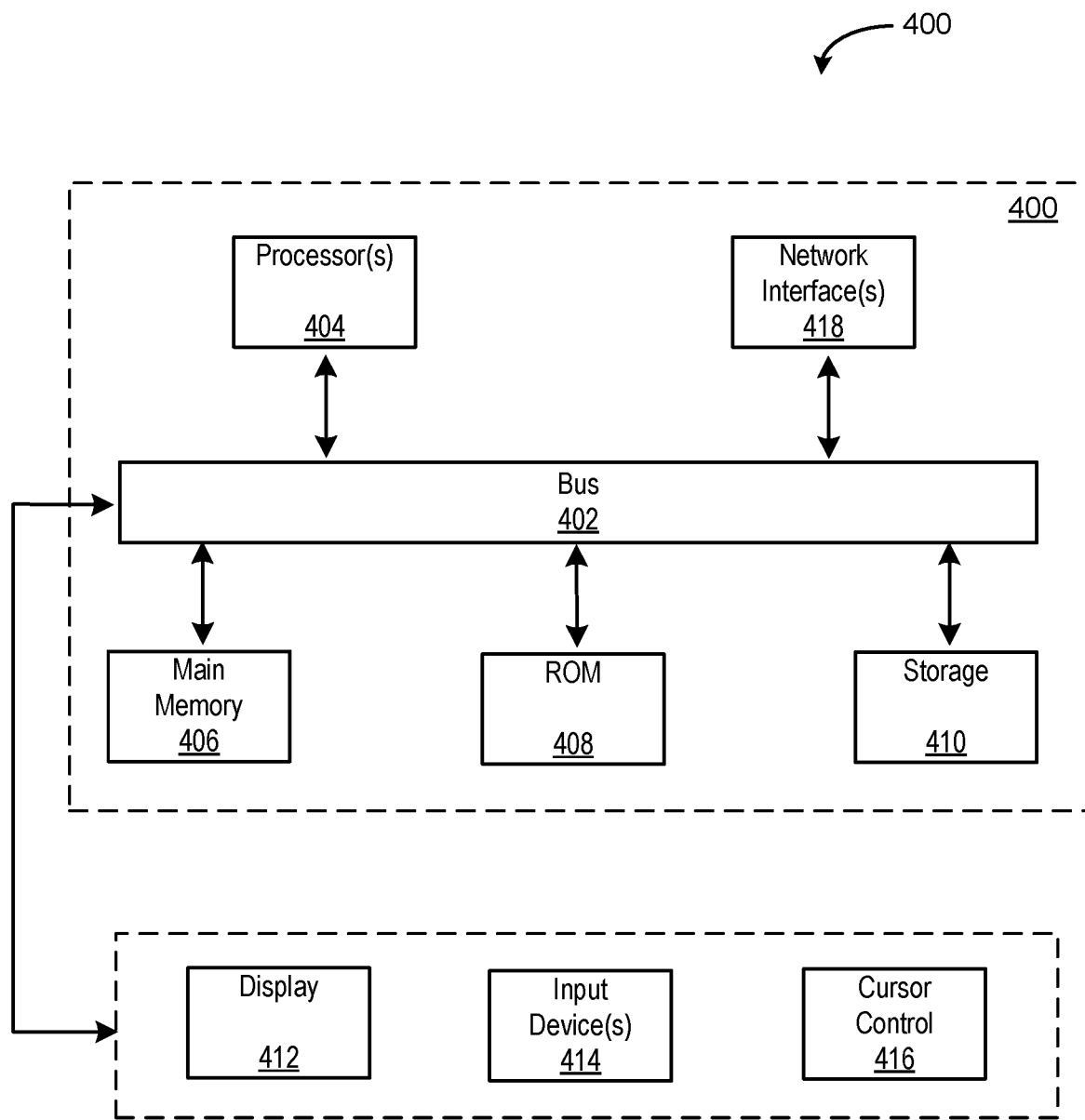
FIG. 4 illustrates an example computer system that may be used in implementing support of multiple management interfaces using ADC list concatenation relating to the embodiments of the disclosed technology.

FIG. 4 depicts a block diagram of an example computer system 400 in which the embodiments described herein may be implemented.

The computer system 400 includes a bus 402 or other communication mechanism for communicating information, and one or more hardware processors 404 coupled with bus 402 for processing information. Hardware processor(s) 404 may be, for example, one or more general purpose microprocessors.

The computer system 400 also includes a main memory 408, such as a random-access memory (RAM), cache and/or other dynamic storage devices, coupled to bus 402 for storing information and instructions to be executed by processor 404. Main memory 408 also may be used for storing temporary variables or other intermediate information during execution of instructions to be executed by processor 404. Such instructions, when stored in storage media accessible to processor 404, render computer system 400 into a special-purpose machine that is customized to perform the operations specified in the instructions. The description of the functionality provided by the different instructions described herein is for illustrative purposes, and is not intended to be limiting, as any of instructions may provide more or less functionality than is described. For example, one or more of the instructions may be eliminated, and some or all of its functionality may be provided by other ones of the instructions. As another example, processor 404 may be programmed by one or more additional instructions that may perform some or all of the functionality attributed herein to one of the instructions.

The computer system 400 further includes storage device 410. The various instructions described herein, including the ADC list concatenation techniques, may be stored in a storage device 410, which may comprise read only memory (ROM), and/or other static storage device coupled to bus 402 for storing static information and instructions for processor 404. A storage device 410, such as a magnetic disk, optical disk, or USB thumb drive (Flash drive), etc., is provided and coupled to bus 402 for storing information and instructions. The storage device 410 may store the computer program instructions (e.g., the aforementioned instructions) to be executed by processor 404 as well as data that may be manipulated by processor 404. The storage device may comprise one or more non-transitory machine-readable storage media such as floppy disks, hard disks, optical disks, tapes, or other physical storage media for storing computer-executable instructions and/or data.

The computer system 400 may be coupled via bus 402 to a display 412, such as a liquid crystal display (LCD) (or touch screen), for displaying information to a computer user. An input device 414, including alphanumeric and other keys, is coupled to bus 402 for communicating information and command selections to processor 404. Another type of user input device is cursor control 416, such as a mouse, a trackball, or cursor direction keys for communicating direction information and command selections to processor 404 and for controlling cursor movement on display 412. In some embodiments, the same direction information and command selections as cursor control may be implemented via receiving touches on a touch screen without a cursor.

The computing system 400 may include a user interface module to implement a GUI that may be stored in a mass storage device as executable software codes that are executed by the computing device(s). This and other modules may include, by way of example, components, such as software components, object-oriented software components, class components and task components, processes, functions, attributes, procedures, subroutines, segments of program code, drivers, firmware, microcode, circuitry, data, databases, data structures, tables, arrays, and variables.

In general, the word "component," "engine," "system," "database," data store," and the like, as used herein, can refer to logic embodied in hardware or firmware, or to a collection of software instructions, possibly having entry and exit points, written in a programming language, such as, for example, Java, C or C++. A software component may be compiled and linked into an executable program, installed in a dynamic link library, or may be written in an interpreted programming language such as, for example, BASIC, Perl, or Python. It will be appreciated that software components may be callable from other components or from themselves, and/or may be invoked in response to detected events or interrupts. Software components configured for execution on computing devices may be provided on a computer readable medium, such as a compact disc, digital video disc, flash drive, magnetic disc, or any other tangible medium, or as a digital download (and may be originally stored in a compressed or installable format that requires installation, decompression or decryption prior to execution). Such software code may be stored, partially or fully, on a memory device of the executing computing device, for execution by the computing device. Software instructions may be embedded in firmware, such as an EPROM. It will be further appreciated that hardware components may be comprised of connected logic units, such as gates and flip-flops, and/or may be comprised of programmable units, such as programmable gate arrays or processors.

The computer system 400 may implement the techniques described herein using customized hard-wired logic, one or more ASICs or FPGAs, firmware and/or program logic which in combination with the computer system causes or programs computer system 400 to be a special-purpose machine. According to one embodiment, the techniques herein are performed by computer system 400 in response to processor(s) 404 executing one or more sequences of one or more instructions contained in main memory 408. Such instructions may be read into main memory 408 from another storage medium, such as storage device 410. Execution of the sequences of instructions contained in main memory 408 causes processor(s) 404 to perform the process steps described herein. In alternative embodiments, hard-wired circuitry may be used in place of or in combination with software instructions.

The term "non-transitory media," and similar terms, as used herein refers to any media that store data and/or instructions that cause a machine to operate in a specific fashion. Such non-transitory media may comprise non-volatile media and/or volatile media. Non-volatile media includes, for example, optical or magnetic disks, such as storage device 510. Volatile media includes dynamic memory, such as main memory 608. Common forms of non-transitory media include, for example, a floppy disk, a flexible disk, hard disk, solid state drive, magnetic tape, or any other magnetic data storage medium, a CD-ROM, any other optical data storage medium, any physical medium with patterns of holes, a RAM, a PROM, and EPROM, a FLASH-EPROM, NVRAM, any other memory chip or cartridge, and networked versions of the same.

Non-transitory media is distinct from but may be used in conjunction with transmission media. Transmission media participates in transferring information between non-transitory media. For example, transmission media includes coaxial cables, copper wire and fiber optics, including the wires that comprise bus 402. Transmission media can also take the form of acoustic or light waves, such as those generated during radio-wave and infra-red data communications.

The computer system 400 also includes a communication interface 418 coupled to bus 402. Network interface 418 provides a two-way data communication coupling to one or more network links that are connected to one or more local networks. For example, communication interface 418 may be an integrated service digital network (ISDN) card, cable modem, satellite modem, or a modem to provide a data communication connection to a corresponding type of telephone line. As another example, network interface 418 may be a local area network (LAN) card to provide a data communication connection to a network, which may include any one or more of, for instance, the Internet, an intranet, a PAN (Personal Area Network), a LAN (Local Area Network), a WAN (Wide Area Network), a SAN (Storage Area Network), a MAN (Metropolitan Area Network), a wireless network, a cellular communications network, a Public Switched Telephone Network, and/or other network. Wireless links may also be implemented. In any such implementation, network interface 418 sends and receives electrical, electromagnetic or optical signals that carry digital data streams representing various types of information. The nodes of the decentralized model building system, as disclosed herein, may be coupled to other participant nodes via the abovementioned networks.

A network link typically provides data communication through one or more networks to other data devices. For example, a network link may provide a connection through local network to a host computer or to data equipment operated by an Internet Service Provider (ISP). The ISP in turn provides data communication services through the world-wide packet data communication network now commonly referred to as the "Internet." Local network and Internet both use electrical, electromagnetic or optical signals that carry digital data streams. The signals through the various networks and the signals on network link and through communication interface 418, which carry the digital data to and from computer system 400, are example forms of transmission media.

The computer system 400 can send messages and receive data, including program code, through the network(s), network link and communication interface 418. In the Internet example, a server might transmit a requested code for an application program through the Internet, the ISP, the local network and the communication interface 418.

The received code may be executed by processor 404 as it is received, and/or stored in storage device 410, or other non-volatile storage for later execution.

The various processes, methods, operations and/or data flows depicted in FIG. 3 (and in the other drawing figures) described in the preceding sections may be embodied in, and fully or partially automated by, code components executed by one or more computer systems or computer processors comprising computer hardware. The processes and algorithms may be implemented partially or wholly in application-specific circuitry. The various features and processes described above may be used independently of one another or may be combined in various ways. Different combinations and sub-combinations are intended to fall within the scope of this disclosure, and certain method or process blocks may be omitted in some implementations. The methods and processes described herein are also not limited to any particular sequence, and the blocks or states relating thereto can be performed in other sequences that are appropriate, or may be performed in parallel, or in some other manner. Blocks or states may be added to or removed from the disclosed example embodiments. The performance of certain of the operations or processes may be distributed among computer systems or computers processors, not only residing within a single machine, but deployed across a number of machines.

While various embodiments of the disclosed technology have been described above, it should be understood that they have been presented by way of example only, and not of limitation. Likewise, the various diagrams may depict an example architectural or other configuration for the disclosed technology, which is done to aid in understanding the features and functionality that can be included in the disclosed technology. The disclosed technology is not restricted to the illustrated example architectures or configurations, but the desired features can be implemented using a variety of alternative architectures and configurations. Indeed, it will be apparent to one of skill in the art how alternative functional, logical or physical partitioning and configurations can be implemented to implement the desired features of the technology disclosed herein. Also, a multitude of different constituent module names other than those depicted herein can be applied to the various partitions. Additionally, with regard to flow diagrams, operational descriptions and method claims, the order in which the steps are presented herein shall not mandate that various embodiments be implemented to perform the recited functionality in the same order unless the context dictates otherwise.

Additionally, the various embodiments set forth herein are described in terms of exemplary block diagrams, flow charts and other illustrations. As will become apparent to one of ordinary skill in the art after reading this document, the illustrated embodiments and their various alternatives can be implemented without confinement to the illustrated examples. For example, block diagrams and their accompanying description should not be construed as mandating a particular architecture or configuration.

What is claimed is:

1. A method comprising:
   receiving, at a network device, a first list including a first set of network packet parameters,
   wherein the first set of network packet parameters are usable for monitoring network traffic in accordance with a first monitoring criteria;
   receiving, at the network device, a second list including a second set of network packet parameters,
   wherein the second set of network parameters are usable for monitoring network traffic in accordance with a second monitoring criteria that is different from the first monitoring criteria; and
   determining, by the network device, a sequential order for arranging the first list with respect to the second list during a concatenation,
   wherein the sequential order is designated by a sorting rule that assigns a priority to each of the first list and the second list,
   wherein the sorting rule comprises a lexicographical order;
   generating, by the network device, a concatenated list by concatenating the first set of network parameters and the second set of network parameters in a manner that forms a single set included in the concatenated list,
   wherein the concatenating comprises linking the first set of network parameters of the first list with the second set of network parameters of the second list in an order consistent with the determined sequential order and based on the priority assigned to the first list and the priority assigned to the second list; and
   programming the network device with the concatenated list such that monitoring network traffic through the network device is performed in accordance with the first monitoring criteria associated with the first list and the second monitoring criteria associated with the second list,
   wherein determining the sequential order further comprises:
   determining a first text-based identifier associated with the first list;
   determining a second text-based identifier associated with the second list;
   sorting the first text-based identifier and the second text-based identifier based on the lexicographical order;
   assigning a high priority to either the first list or the second list corresponding to the respective text-based identifier that is sorted higher in the lexicographical order; and
   assigning a low priority to either the first list or the second list corresponding to the respective text-based identifier that is sorted lower in the lexicographical order.

2. The method of claim 1, wherein generating the concatenated list further comprises: arranging the list that is assigned to the higher priority first in the sequential order; and arranging the list that is assigned to the lower priority second in the sequential order.

3. The method of claim 1, wherein the sorting rule comprises a chronological order.

4. The method of claim 3, wherein determining the sequential order further comprises:
   determining a first time-based identifier associated with a time in which the first list is received by the network device;
   determining a second time-based identifier associated with a time in which the second list is received by the network device;
   sorting the first time-based identifier and the second time-based identifier based on a chronological order;
   assigning a high priority to the list corresponding to the time-based identifier sorted higher in the chronological order; and
   assigning a low priority to the list corresponding to the time-based identifier that is sorted lower in the chronological order.

5. The method of claim 4, wherein generating the concatenated list further comprises:
   arranging the list that is assigned to the higher priority first in the sequential order; and
   arranging the list that is assigned to the lower priority second in the sequential order.

6. The method of claim 1, wherein the first list is generated by a first management interface associated with a network analytics engine.

7. The method of claim 6, wherein the second list is generated by a second management interface associated with the network analytics engine.

8. The method of claim 7, wherein monitoring the network traffic is performed by a network analytics engine and the network device is a switch.

9. A switch, comprising:
   a processor;
   a non-transitory machine-readable storage medium comprising instructions executable by the processor,
   the instructions programming the processor to:
   receive a first list including a first set of network packet parameters,
   wherein the first set of network packet parameters are usable for monitoring network traffic in accordance with a first monitoring criteria;
   receive a second list including a second set of network packet parameters,
   wherein the second set of network parameters are usable for monitoring network traffic in accordance with a second monitoring criteria that is different from the first monitoring criteria; and
   determine a sequential order for arranging the first list with respect to the second list during a concatenation,
   wherein the sequential order is designated by a sorting rule that assigns a priority to each of the first list and the second list;
   generate a concatenated list by concatenating the first set of network parameters and the second set of network parameters in a manner that forms a single set included in the concatenated list,
   wherein the concatenating comprises linking the first set of network parameters of the first list with the second set of network parameters of the second list in an order consistent with the determined sequential order and based on the priority assigned to the first list and the priority assigned to the second list;

monitor the network traffic through the switch by identifying one or more packets in the network traffic corresponding to the first monitoring criteria and corresponding to the second monitoring criteria;

program a single hardware lookup of the switch with the concatenated list such that monitoring network traffic is performed in accordance with the first monitoring criteria associated with the first list and the second monitoring criteria associated with the second list;

store the first list in an Open vSwitch Database (OVSDB), including a first time-based identifier associated with the time which the first list was stored;

store the second list in the OVSDB, including a second time-based identifier associated with the time which the second list was stored;

sort the first time-based identifier and the second time-based identifier based on a chronological order;

assign a high priority to either the first list or the second list corresponding to the respective text-based identifier that is sorted higher in the lexicographical order; and assign a low priority to either the first list or the second list corresponding to the respective text-based identifier that is sorted lower in the lexicographical order.

10. The switch of claim 9, wherein the instructions further program the processor to: monitor the traffic through the switch using counters such that the traffic flow is not manipulated.

11. The switch of claim 9, further comprising the Open vSwitch Database (OVSDB).

12. The switch of claim 9, comprising:
a plurality of network interfaces;
wherein at least one of the plurality of network interfaces communicatively connects to a first network including a first management interface that generates the first list; and
wherein at least one of the plurality of network interfaces communicatively connects to a second network including a second management interface that generates the second list.

13. The switch of claim 12, wherein the switch is a core switch positioned at the backbone of a network.

14. The switch of claim 12, wherein the first list and the second list comprise scripts that are executable by the processor.

15. The switch of claim 14, wherein the instructions further program the processor to:
perform automated diagnostics and data collection based in accordance with the scripts.

16. The switch of claim 15, wherein the instructions further program the processor to:
provide network analytics to the first management interface and the second management interface based on monitoring network.

* * * * *